US010697669B2

(12) United States Patent
Kirscht

(10) Patent No.: US 10,697,669 B2
(45) Date of Patent: Jun. 30, 2020

(54) CSP TRACKING

(71) Applicant: ERFIS GmbH, Erfurt (DE)

(72) Inventor: Lukas Kirscht, Munich (DE)

(73) Assignee: ERFIS GmbH, Erfurt (DE)

( * ) Notice: Subject to any disclaimer, the term of this patent is extended or adjusted under 35 U.S.C. 154(b) by 362 days.

(21) Appl. No.: 15/639,369

(22) Filed: Jun. 30, 2017

(65) Prior Publication Data
US 2017/0363330 A1 Dec. 21, 2017

Related U.S. Application Data

(63) Continuation of application No. PCT/EP2015/081374, filed on Dec. 29, 2015.

(30) Foreign Application Priority Data

Dec. 30, 2014 (DE) .................... 10 2014 019 588

(51) Int. Cl.
*F24S 23/74* (2018.01)
*F24S 23/79* (2018.01)
*F24S 50/20* (2018.01)
*F24S 23/71* (2018.01)
*F24S 23/70* (2018.01)

(52) U.S. Cl.
CPC ............. *F24S 50/20* (2018.05); *F24S 23/715* (2018.05); *F24S 23/74* (2018.05); *F24S 23/79* (2018.05); *F24S 23/82* (2018.05); *Y02E 10/45* (2013.01); *Y02E 10/47* (2013.01)

(58) Field of Classification Search
CPC ........ F24S 50/20; F24S 2050/25; F24S 50/80; F24S 23/70; F24S 23/71; F24S 23/715; F24S 23/72; F24S 23/74; F24S 23/75; F24S 23/77; F24S 23/79; F24S 23/81; F24S 23/80; F24S 23/82; G01S 3/7861; G01S 3/7862; Y02E 10/45; Y02E 10/47
See application file for complete search history.

(56) References Cited

U.S. PATENT DOCUMENTS 3,996,460 A    12/1976   Smith
4,000,734 A *   1/1977   Matlock ................. F24S 23/74
                                                                      126/576

(Continued)

FOREIGN PATENT DOCUMENTS

CN       103090552 A    5/2013
CN       203012516 U    6/2013

(Continued)

OTHER PUBLICATIONS

Chinese Office Action dated Oct. 31, 2018 in corresponding application 201580071744.5.

*Primary Examiner* — John R Lee
(74) *Attorney, Agent, or Firm* — Muncy, Geissler, Olds & Lowe, P.C.

(57) ABSTRACT

A CSP system including a reflector and a receiver for concentrating the solar radiation incident on the reflector onto the receiver, comprising a shadow blind and a shadow receiver as well as a colour and/or brightness digitizing sensor arranged to detect the shadow of the shadow blind on the shadow receiver in order to determine a deviation of the actual shadow position from a target shadow position, a tracking means configured to adapt the position of the reflector and the receiver according to the deviation.

10 Claims, 19 Drawing Sheets

(56) References Cited

U.S. PATENT DOCUMENTS

| | | | |
|---|---|---|---|
| 4,205,659 A * | 6/1980 | Beam | G01S 3/7861 126/578 |
| 4,445,030 A | 4/1984 | Carlton | |
| 5,512,742 A | 4/1996 | Mattson | |
| 6,274,862 B1 | 8/2001 | Rieger | |
| 6,498,290 B1 * | 12/2002 | Lawheed | H02S 40/44 136/246 |
| 7,667,833 B1 * | 2/2010 | Diver | G01B 11/26 356/138 |
| 8,981,272 B2 * | 3/2015 | Armstrong | G01J 1/42 250/203.4 |
| 9,329,256 B2 * | 5/2016 | Dolce | G01J 1/02 |
| 9,787,247 B2 * | 10/2017 | Wheelwright | H02S 40/44 |
| 9,910,156 B2 | 3/2018 | Hines | |
| 2004/0079863 A1 | 4/2004 | Lasich | |
| 2004/0239786 A1 * | 12/2004 | Masuyama | H04N 3/155 348/294 |
| 2007/0251569 A1 * | 11/2007 | Shan | H01L 31/052 136/246 |
| 2009/0179139 A1 * | 7/2009 | Hines | G05D 3/105 250/203.4 |
| 2009/0272375 A1 * | 11/2009 | Pedretti | F24S 23/81 126/696 |
| 2011/0000478 A1 * | 1/2011 | Reznik | G01S 3/7861 126/574 |
| 2011/0120448 A1 * | 5/2011 | Fitch | G01S 3/7861 126/601 |
| 2011/0155119 A1 * | 6/2011 | Hickerson | G01S 3/7803 126/574 |
| 2012/0132194 A1 * | 5/2012 | Saeck | F24S 50/20 126/574 |
| 2013/0092155 A1 * | 4/2013 | McCord | G01S 3/7861 126/601 |
| 2013/0133640 A1 | 5/2013 | Madore et al. | |
| 2014/0071439 A1 * | 3/2014 | Pedretti-Rodi | G01M 11/005 356/124 |
| 2017/0363330 A1 * | 12/2017 | Kirscht | F24S 23/79 |

FOREIGN PATENT DOCUMENTS

| | | |
|---|---|---|
| DE | 10 2008 021 730 A1 | 11/2008 |
| DE | 10 2008 008 403 A1 | 8/2009 |
| DE | 102014019588 A1 | 6/2016 |
| JP | S5682344 A | 7/1981 |
| WO | WO 2013/136171 A2 | 9/2013 |
| WO | WO2014004882 A2 | 1/2014 |
| WO | WO2016107882 A2 | 7/2016 |

* cited by examiner

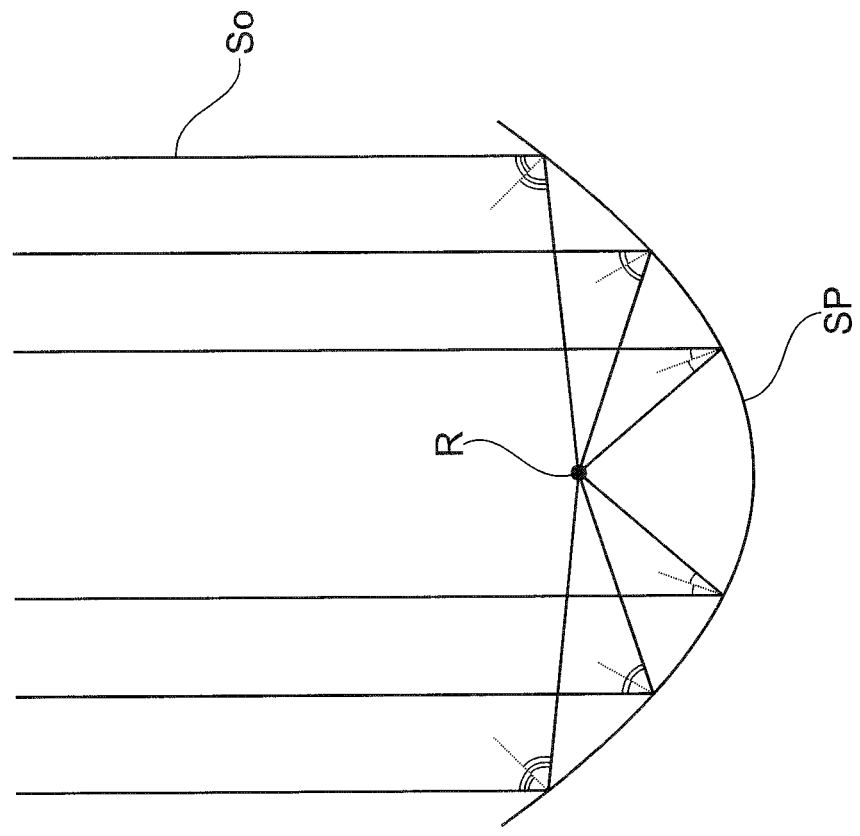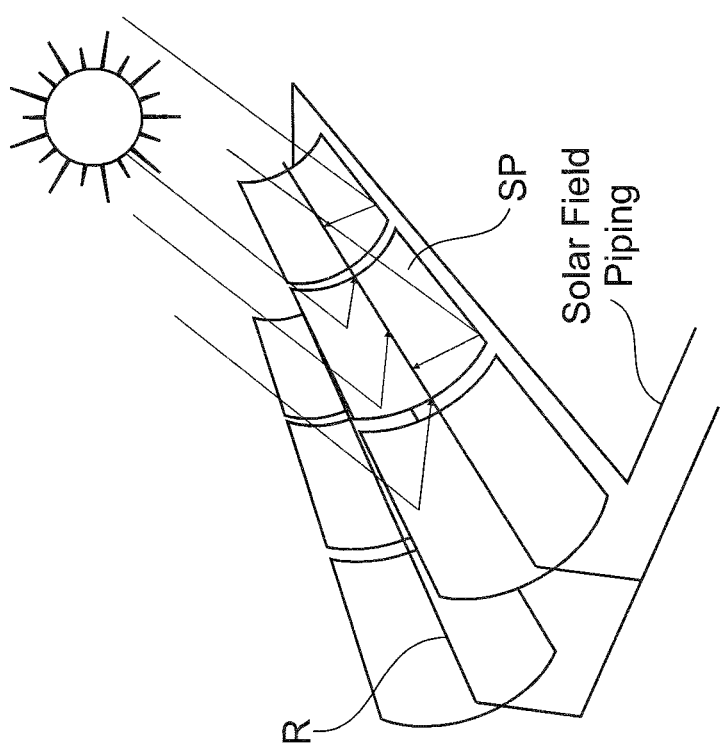
Fig. 1

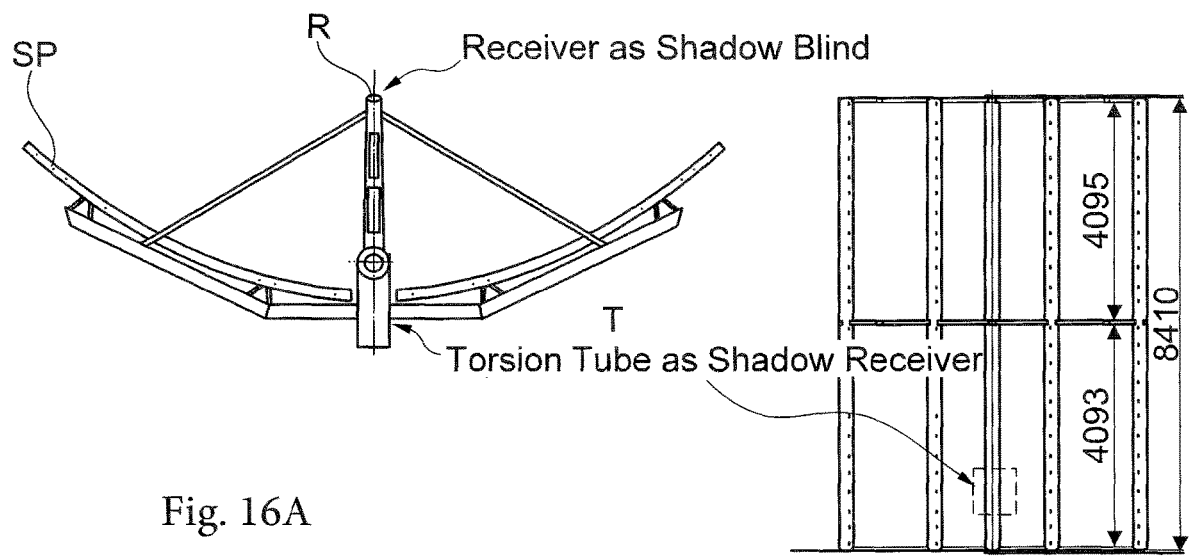
Fig. 16A
Fig. 16C
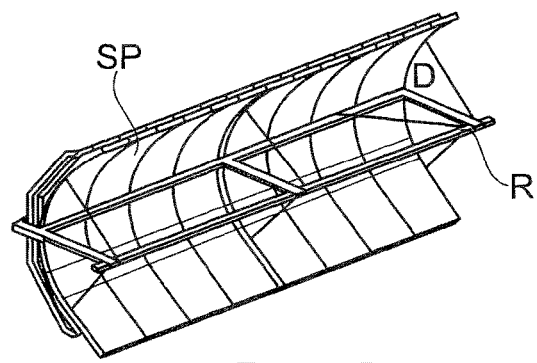
Fig. 16B

CSP TRACKING

This nonprovisional application is a continuation of International Application No. PCT/EP2015/081374, which was filed on Dec. 29, 2015, and which claims priority to German Patent Application No. 10 2014 019 588.0, which was filed in Germany on Dec. 30, 2014, and which are both herein incorporated by reference.

BACKGROUND OF THE INVENTION

Field of the Invention

The present invention relates to a system and a method for tracking the sun with systems concentrating solar power.

Description of the Background Art

The English expression Concentrated Solar Power ("CSP") is also commonly used as a generic term. In such systems and methods, usually the direct solar radiation is focussed onto a receiver or solar absorber by means of reflectors. Since the position of the sun changes over time, the alignment of components of the system has to be accordingly adapted, i.e. the sun has to be tracked with the system.

CSP systems focus the direct solar radiation by using focussing reflector areas that focus the incident sunlight onto the absorber. The reflector and the absorber track the sun. The systems collect solar energy in this way via a large area of the reflector and concentrate it onto a comparably small area of the receiver. The reflector or collector concentrates, for example, radiation incident on an area of 60 m$^2$ onto a receiver area of 1 m$^2$. It is thus possible to achieve low losses and high temperatures by means of the ratio of large collector area to small receiver area.

In so-called solar farm power plants, the heat is collected in many absorbers or receivers distributed over the area, whereas, for example, in solar tower power plants or parabolic power plants, the solar radiation is focussed by means of point concentrators onto a focal spot. All of these systems differ in many features from direct solar systems or solar electricity plants, such as, for example, photovoltaic plants, as well as from solar thermal plants without focussing, such as, for example, thermal power plants.

The CSP systems within the meaning of the present invention in particular and preferably include systems comprising one or many parabolic trough collectors or Fresnel collectors connected in parallel, so-called linear concentrators. In the collector array, for example, a heat transfer medium is heated, such as, e.g., heat transfer oil or superheated steam. The heated heat transfer medium is subsequently supplied to, for example, a turbine and a generator for the generation of electric energy.

The system of a parabolic trough power plant is exemplarily shown in FIG. 1. Parabolic trough collectors consist of curved mirrors SP which focus the sunlight So onto an absorber tube or a so-called receiver R extending in the focal line (cf. right illustration). In the absorber tubes, the concentrated solar radiation is converted into heat and dissipated to a circulating heat transfer medium. The heat medium is than passed through pipes (solar field piping) for further use or energy generation (conversion). For reasons of cost, the parabolic troughs usually track the sun only uniaxially. Therefore, they are arranged in the north-south direction and track the sun or are tilted only according to the solar altitude during the course of a day. This is schematically illustrated in FIG. 2.

Parabolic troughs or parabolic trough mirrors have a cross-section that is essentially parabolically configured, preferably the cross-section perpendicular to the trough axis. Such a shape of the mirror has the property that all rays incident parallel to its axis of symmetry are reflected through the focal spot of the parabola (cf. right illustration in FIG. 1). This geometric principle is applied, i.a., for parabolic (trough) mirrors using a parabolic area comprising reflecting surfaces (mirrors) in order to concentrate incident sunlight in a focal spot or in the case of a parabolic trough mirror on a focal line. The energy of the focussed sunlight is absorbed by so-called receivers mounted along the focal spot or the focal line and, converted for example into heat, used for further energy conversion. Known parabolic trough mirrors essentially comprise a trough-like or curved mirror (or a plurality of mirrors forming together a trough) referred to as reflector, an absorber tube referred to as receiver and a supporting structure or base.

FIG. 3 shows a schematic illustration of an exemplary reflector design comprising a parabolic trough mirror 1. The parabolic trough mirror 1 comprises an exemplary substructure or supporting structure in the form of a guide curve 2 comprising a receiver in the form of an absorber tube 3. The guide curve 2 provides a first bent guide matrix 4 serving as a rest for a mirror element, here a first flexible window glass 5 (illustrated in the right half of the parabolic trough mirror 1 of FIG. 3), when it is bent and restrained onto the guide curve 2. In FIG. 3, the window glass 5 is shown in its unbent and strained condition. Furthermore, the guide curve 2 preferably provides a second bent guide matrix which essentially corresponds to the first one and in the illustrated cross-section is arranged opposite to it. It serves as a rest for a second flexible window glass 10, which is illustrated here in its bent condition in the left half of the parabolic trough mirror. The trough may have a radius or an opening or aperture width of the parabola of about 1 to 8 m, preferably of about 1.5 to 5 m, wherein the curvature may vary in a lateral view of the parabolic mirror 1 along the guide matrix 4.

The guide matrix of the guide curve 2 can be formed of bent ribs 6A, 6B, as illustrated here. In the area of the reference signs 6A, 6B, where the ribs abut in the illustration according to FIG. 3, i.e. at the deepest point of the trough, the ribs can be spaced apart from each other. In this case, preferably a beam, for example, a so-called torsion tube, extends along the longitudinal axis of the trough at this point (of the cross-section). This can be deduced, for example, from the illustrations according to FIGS. 8, 9, 10, 11, 12, 15, 16A-C and 17B. This beam is tightly connected with the supporting structure or guide matrix. Preferably, it extends parallel to a swivel axis, which in turn preferably extends along the deepest point of the trough and along which the trough can be swivelled in order to achieve an optimum orientation towards the sun. Alternative embodiments of the general design, for example, the use of prebent mirror elements and other restraints or other substructures, as well as of tracking and of the tracking axis are known. The discussion of the present invention herein includes the previously described designs but is not limited thereto.

The so-called Fresnel mirror collectors, cf. FIG. 4, are a further development of the parabolic troughs. A plurality of parallel, non-curved or slightly curved mirror strips ("reflector") arranged at ground level (according to the principle of a Fresnel lens) reflect the incident direct radiation of the sunlight ("light") onto an absorber tube ("absorber tube"). A second reflector ("secondary reflector") causing better focussing onto the absorber tube may be used. The strips track the sun uniaxially. An additional secondary mirror behind the tube directs the radiation to the focal line.

This construction combines the functioning principles of parabolic trough collectors and of tower power plants, wherein curved mirrors (see above, slightly curved mirrors may actually be used) as well as multiaxial solar position tracking are dispensed with and the modular structure is maintained. In contrast to most of the parabolic trough designs, the absorber tube is not moved. On the one hand, it is thus possible to build very long collectors which exhibit low flow resistances to the heat transfer medium due to lacking tube bends and flexible connections. On the other hand, however, there are losses due to shadow between the mirror strips.

The discussion of the present invention herein includes the previously described designs but is not limited thereto.

In the solar tower power plant, cf. FIG. 5, also referred to as central receiver power plant, the absorber R is arranged at a raised level on a tower Tu. During sunshine, a plurality of, hundreds to thousands of, automatically positioning mirrors SP (heliostats) align such that the sunlight is reflected onto the central absorber (receiver). At the top of the tower, high temperatures of up to several thousand degrees centigrade occur due to the strong concentration of the solar radiation.

The discussion of the present invention herein includes the previously described designs but is not limited thereto.

Further systems, usually for a decentralized application with a smaller range of performance, include, for example, plants comprising parabolic mirrors (parabolic dishes) or solar Stirling plants, in which solar thermal energy is converted into mechanical energy by means of a Stirling engine. Usually, electrical energy is generated therewith in a directly connected generator; cf. FIG. 6.

The discussion of the present invention herein includes the previously described designs but is not limited thereto.

Precise alignment and focussing of the solar radiation are necessary due to the concentration of the solar radiation onto a comparatively small receiver area. A further criterion is the alteration in the position of the sun and thus in the angle of incidence of the solar radiation as a function of time and solar altitude. Therefore, a tracking arrangement is required for tracking the sun with systems concentrating solar power. In this connection, the calculated position of the sun is usually used as actual value. However, this entails problems in practice.

In particular, the actual solar radiation can deviate from the solar radiation expected as a result of the calculated position of the sun. This deviation is not astronomically caused but, for example, is due to light refractions of the solar radiation at air layers having considerably differing temperatures. Furthermore, deviations from the precalculated or calculable radiation paths occur due to constructional inaccuracy during building the system, constructional inaccuracy developing in the course of operation, e.g., base movements, as well as constructional inaccuracy caused by the wear of drives, as well as inaccuracy resulting from sensory difficulties when recording the actual position.

Consequently, the components of the system have to fulfil a number of requirements. For example, the substructure holding the reflector and/or receiver is of importance as regards the exact positioning of reflector and/or receiver. Therefore, high demands on dimensional accuracy, weather resistance, wind load and weight have to be met. The tracking system or tracking, whether discontinuous or continuous, must also fulfil requirements with respect to starting accuracy, holding accuracy, energy consumption, safeguarding against failure and policy compliance. The system components, in particular of the substructure and tracking arrangement, are of particular importance as regards the aforementioned constructional inaccuracies in tracking.

In order to attenuate or eliminate the aforementioned and further problems with tracking, systems are used that determine the actual position of the sun and the actual solar radiation deviating from the expected solar radiation. In this connection, the angle of incidence of the solar radiation onto the reflector is of particular importance.

To this end, it is known, on the one hand, to use systems which are completely independent and not connected to the structure to be respectively aligned and which determine the actual position of the sun. These systems include, for example, a sundial. However, this usually does not overcome at least the aforementioned problems resulting from constructional inaccuracy, from wear or ageing.

Alternatively, it is known to combine the position measurement with the system design and to perform a relative position measurement of the sun with respect to the concentrating system. As regards this measurement, ways are known to measure the radiation directly at the receiver. However, this turned out to be a non-viable option as well. In particular, the radiation intensity/density at the receiver is very high so that the requirements which the sensors as well as the components have to fulfil are beyond the available scope—as regards both economic criteria and the general fulfilment of the technical requirements. As far as available, the lifetime of the components is extremely short.

It is also known to resort to the observation of a shadow by means of specific sensors which analyse the cast shadow. In this connection, the shadow cast by a blind is analyzed by means of a sensor comprising two photovoltaic (PV) cells. When the shadow extends symmetrically on the centre line of the PV cell array, the tensions of the two cells have the same value. When the shadow migrates out of the centre due to movement of the collector or the sun, the tension of the cell that is shaded more than the other reduces.

Such a system usually consists of a PV cell sensor connected via wiring to a signal amplifier which in turn is connected to a separate control unit in the solar field for signal processing, said control unit being accommodated in a separate housing. The control runs a program for analysing the signal values and transmits the results via wiring via an interface to the control room. Control signals are then sent to the plant for accordingly adapting the alignment of the system. This is schematically shown in FIG. 7.

However, such systems have proved to be disadvantageous in several respects. On the one hand, they are complex and their installation and maintenance is cost-intensive and service-intensive. For example, they have to be cleaned about twice a day or more often. On the other hand, the resolution and accuracy of the systems is not sufficient. Furthermore, the lifetime of the system is limited and high costs arise due to construction-related maintenance work and repairs as well as due to software-related maintenance. Finally, the installation of the entire system is intricate and involves comprehensive interference with the existing system architecture.

CN 203012516 U discloses a photovoltaic system comprising a tracking arrangement for the system. The tracking arrangement for the system makes use of a defined geometric body, namely a cone attached to a transparent glass pane as well as of a camera obscura. The geometric shape of the shadow of the cone is detected on the transparent pane and its height is calculated. The alignment of the PV system is adapted via several axes. This system makes use of a separate unit for calculating the actual position of the solar radiation, said separate unit having a complex structure consisting of a plurality of cooperating parts. The geometric evaluation is error-prone and depends in particular on the accurate positioning of the individual parts relative to each other. The described structure eventually does not fulfil either the high demands on the accuracy of tracking being required in the area of the present invention. The use of solar energy for the generation of energy by means of photovoltaic elements does not require a comparable concentration of radiation incident on a large reflector area onto a small receiver area. Therefore, a comparably inaccurate alignment of the photovoltaic elements relative to the sun actually has no great impact on the efficiency of the plant. Usually, deviations of 1° from the optimum alignment are tolerated. In the case of stationary PV plants, e.g., in the private sector, usually even a deviation of 30° from the optimum radiation incidence is tolerated. In CSP systems, however, a deviation of 1° or more is usually undesired since this has already a significant impact on the efficiency of the plant. In the area of CSP, this has something to do with, inter alia, the geometry of the collector. In this case, for example, two system parameters have to be considered:

the distance from the receiver to the mirror surface and the diameter of the receiver.

For example, a parabolic trough having a focal line at about 1,795 mm and an opening width of 6,000 mm as well as a receiver tube having a diameter of 70 mm can preferably be used.

The smallest distance between the mirror and the receiver is 1,795 mm, the greatest distance, at the ends of the parabola, is about 3,100 mm.

Due to the size of the sun of about 0.5° (seen as an angle sector from the earth), this leads theoretically to a focal line width of about 27 mm. So far the calculation is easily comprehensible.

However, further factors that cannot be predicted have also to be taken into account, such as, for example: the mechanical components (i.a., construction, receiver tube holder, bases, etc.) the mirror inaccuracies as well as the drive inaccuracies.

The diameter of the sun, the mirror inaccuracy and the mechanical components alone exhaust the receiver tube diameter of 70 mm available in this example. Hence, exact manufacturing and constructional dimensions become very important and also as regards the drive systems and components each tenth or even hundredth of a degree is decisive.

SUMMARY OF THE INVENTION

It is therefore an object of the present invention to provide an improved CSP system. The system should preferably overcome the disadvantages of the prior art. In particular, it is intended to be simple, economical, long-lasting and accurate.

This problem is solved in particular by an improved tracking system and method, in particular for CSP systems. Preferably, the problem is solved with the features of the independent claims and aspects. The dependent claims and aspects as well as the features described in the following are preferred additional or alternative embodiments.

According to an exemplary embodiment of the present invention, the shadow of a shadow blind tightly connected to the structure can be resorted to for the purpose of determining the actual solar radiation and adapting the alignment of the reflector depending on the incidence angle of the solar radiation. It is further preferred that the shadow of the shadow blind, which preferably forms part of the existing structure, and further preferably the shadow of the receiver itself is used. This permits a particularly simple and long-lasting structure, preferably without the need of additional components or fittings. At the same time, a high degree of reliability is achieved, in particular since the shadow blind is an integral component of the structure and thus no interface deviations occur.

FIG. 8 illustrates the example of the cast shadow of a receiver tube in the collector. In the shown alignment of the receiver and the collector of a parabolic trough plant, the shadow S of the receiver tube R (not visible in the Figure) is not directly on the collector mirrors but on a beam T of the substructure. In conventional parabolic trough designs, they are formed of two mirror rows made of curved mirrors SP and arranged symmetrically with respect to a centre line. The mirrors SP are arranged on opposite sides of a beam T extending centrically longitudinally. The beam T as well as the receiver tube R are preferably in the centre plane $M_E$ of the parabolic trough (cf. FIG. 3). When the trough is optimally aligned with respect to the sun, the shadow $S_R$ of the receiver tube R falls centrically onto the beam, as indicated in the illustration according to FIG. 8. It is clear that any shadow receiver can be used as beam T. It does not have to be a supporting element of the structure.

The illustration according to FIG. 9 shows a scenario according to FIG. 8 in a rendered version. Supporting components of the collector arrangement have been omitted (such as, e.g., struts of the receiver tube, which seems to be freely floating but actually is mechanically fixedly positioned) in order to improve the illustration. In addition to the illustration in FIG. 8, FIG. 9 reveals the reflection Refl. of the receiver tube R on the mirror SP. This reflection varies depending on the change in the viewer's location, in contrast to the shadow, which is independent from the position of the viewer. FIG. 10 illustrates a detail of the rendered illustration according to FIG. 9 in which the receiver tube is not visible.

Accordingly, FIG. 11 shows a further exemplary view of a scenario according to FIG. 8 in a rendered version. Supporting components of the collector arrangement have again been omitted (such as, e.g., struts of the receiver tube, which seems to be freely floating but actually is mechanically fixedly positioned) in order to improve the illustration. FIG. 11 also reveals the reflection Refl. of the receiver tube R on the mirror SP. Due to the different location of the viewer, the reflection is here at another place. This is exemplarily also revealed by the graphically incorporated "erfis" logo that is likewise reflected in the mirror.

FIG. 12 shows a detail of a rendered illustration according to FIG. 9 or FIG. 10 in which struts $R_{ST}$ of the receiver tube R can be seen just like respective reflections.

FIG. 13 depicts the geometric conditions of the cast shadow by means of the example of the receiver tube shadow and FIG. 14 schematically shows the shadow and explains what is meant by the terms or regions of umbra KS and penumbra HS. FIG. 13 depicts the penumbra as the distance resulting on the shadow receiver between the intersections of the shadow receiver with two lines. These lines are the tangents at opposite sides of the sun and a side or point of the receiver, as illustrated in FIG. 13. The illustration in FIG. 13 shows the penumbra at the right side of the illustration. The left penumbra is respectively formed by using the tangents at the opposite side of the receiver tube. The umbra is the region between the penumbras.

The width of the penumbra is dependent on the distance of the shadow blind from the shadow receiver. All shadow parameters can be calculated by means of the sun diameter $d_{Sonne}$, the receiver diameter $d_{Rohr/Receiver}$ (tube diameter in the illustration), the distance $h_{Rohr}$ between the receiver and the shadow receiver, for example the beam T, and the planet distance $h_{Sonne}$ between the sun and the shadow receiver. FIG. 14 exemplarily shows the shadow of the receiver tube on a shadow receiver, wherein the central umbra and the lateral penumbras are highlighted as well as preferred dimensions indicated. It is likely here that shadows (collectors) on the earth can be taken as a basis and that thus a "sun diameter" of 0.5° is relevant. The width of the umbra and that of the penumbra can be calculated in particular by means of the distance from the shadow blind to the shadow receiver. To this end, the angle sector of the sun diameter of 0.5° is taken and the tangent is used to calculate the width of the penumbra. The present invention, however, analyses the geometry and intensity of the shadow. No other information about the sun or the like is necessary. Even further blurring effects such as, for example, cirrus in the higher atmospheric layers or high humidity do not irritate the algorithm of the present invention.

For the purpose of determining the deviation of the collector position from the optimum position, the position of the shadow of the shadow blind on the shadow receiver, preferably a shadow of the structure, preferably of the receiver tube, on the shadow receiver, preferable the beam T, is determined.

According to an embodiment of the present invention, a camera K, preferably an IP camera, is used therefor. The camera should be in particular configured for the ambient conditions. The temperature range and the protection rating against water and dust are primarily to be taken into account. Night vision capabilities usually are of no importance. Parameters such as contrast, sensitivity and colour space in the standard range are sufficient. Preferred cameras include line scan cameras or other colour and brightness digitizing sensors.

The determination of two possible deviations is in particular alternatively preferred in the analysis of the shadow. On the one hand, the absolute deviation of the shadow (actual position in comparison to the target position) can be determined, which has an angular deviation, e.g., in degrees, or a position deviation from the centre or the centre line as the result. On the other hand, a deviation can be determined which has only a tendency (e.g., left or right) as the result. Both approaches are preferred and appropriate to reduce and preferably to eliminate deviations in tracking.

The camera is preferably installed at the existing structure, preferably at a beam of the shadow blind, preferably of the receiver, or at the receiver itself. The camera is preferably arranged between the shadow blind and the shadow receiver.

Preferable alternative and/or additional features of the present invention can be deduced from the following exemplary aspects.

A CSP system comprising a reflector and a receiver for concentrating the solar radiation incident on the reflector onto the receiver, comprising a shadow blind and a shadow receiver as well as a, preferably colour and/or brightness digitizing, sensor arranged to detect the shadow of the shadow blind on the shadow receiver in order to determine a deviation of the actual shadow position from a target shadow position, a tracking means configured to adapt the position of the reflector and the receiver according to the deviation. The reflector can comprise a mirror arrangement. The receiver can be a receiver tube. The reflector and/or the receiver can be connected to or held by a substructure or a supporting structure. The shadow blind can be tightly connected to the structure, for example is an integral component of the existing (sub)structure, or can bethe receiver itself. The reflector can be the shadow receiver. A beam T of the substructure can be the shadow receiver; wherein the beam T is preferably a torsion tube along the axis of which the reflector and/or the receiver can be tilted, in particular for tracking purposes.

Also, the reflector can comprise two mirror rows made of curved mirrors SP and arranged symmetrically with respect to a centre line. The mirrors SP can be arranged on opposite sides of a beam T extending centrically longitudinally.

In an embodiment, the beam T as well as the receiver, can be configured as a receiver tube R, are in the centre plane $M_E$ of the parabolic trough. Further, the arrangement can be configured such that, when the reflectors are optimally aligned with respect to the sun, the shadow $S_R$ of the shadow blind falls onto the shadow receiver at a predetermined position, preferably centrically.

In an embodiment, the system can be swivelled along an axis arranged in the area of the deepest point of the parabolic trough, wherein the axis can extend parallel to a longitudinal axis of the receiver. The sensor can be a camera K, for example an IP camera, or a line scan camera. The reflector can be a linear concentrator, for example a parabolic trough or a Fresnel collector.

In an embodiment, the system can comprise a plurality of linear concentrators, preferably parabolic trough collectors or Fresnel collectors, connected in parallel. The system can also comprise a solar tower and/or a parabolic dish. The reflector area can be considerably greater than the receiver area, for example more than 10 times greater, more preferably more than 30 times greater and most preferably more than 50 times greater.

In an embodiment, the shadow receiver is no sensor. Also, in the CSP system the shadow receiver can be non-transparent or opaque. The receiver and/or the reflector can be no photovoltaic sensor and/or does not comprise a photovoltaic sensor.

In an embodiment, the CSP system further comprises a control, which is preferably integrated in or integratable into a control room. Further, the sensor can detect a shadow image. The control can evaluate the shadow detected by the sensor. The control can determine shadow parameters of the detected shadow, wherein the shadow parameters preferably comprise the umbra KS and penumbra HS. The control can consider at least one or more of the following parameters: sun diameter $d_{Sonne}$, receiver diameter $d_{Receiver}$, distance $h_{Rohr}$ between receiver and shadow receiver, and planet distance $h_{Sonne}$ between sun and shadow receiver.

In an embodiment, the control can be configured to determine the position of the shadow (actual position) of the shadow blind on the shadow receiver, preferably of a shadow of the structure, preferably the receiver tube, on the shadow receiver, preferably the beam T, and to compare it with a target position preferably corresponding to the position with respect to the sun in the case of optimal alignment, and wherein the control is further preferably configured to determine the deviation of the actual position from the target position, and is furthermore preferably configured to calculate preferably the necessary adaptation of the alignment on the basis thereof.

In an embodiment, the system can be configured to determine the absolute deviation of the shadow, for example, the actual position in comparison with the target position, preferably with the result of an angular deviation, e.g., in degrees, or a position deviation from the centre or the centre line, or is configured to determine a tendency of a deviation, for example, a direction, e.g., left or right. The reflector can comprise parabolic troughs and the shadow blind comprises the receiver tube, wherein the shadow receiver is configured as a central torsion tube of the substructure.

The camera can be fixed at the existing structure, for example, at a beam of the shadow blind, preferably of the receiver, or at the receiver itself. The sensor, for example the camera, can be arranged between the shadow blind and the shadow receiver. The evaluation cycle of the shadow detected by the sensor is about 1 second or less.

In an embodiment the CSP system further comprises one or more computers, servers, microprocessors/signal processors. The shadow data determined by the sensor can be transmitted via a wiring standard or wireless, preferably via radio, WLAN, Bluetooth, etc.

In an embodiment, the control can consider one or more of the following parameters: distance (position) of the shadow blind from (relative to) the axis of rotation of the parabolic trough, distance (position) of the shadow receiver from (relative to) the axis of rotation of the parabolic trough, position of the camera, shooting angle of the camera, resolution of the camera, and/or resolution of the algorithm used.

In an embodiment, the system, for example the control, can be configured: to copy an image from the camera into a memory, to evaluate the image, preferably in that a scan line is decomposed into black-and-white values and/or the contrast is increased. The evaluation can be carried out for several scan lines, for example at least 2, more preferably at least 4 and most preferably 6 or more than 6 lines. The shadow entrance, exit and penumbra region are determined for each line, a rectangle can be formed for each line to be analysed. The shadow centre (actual position) is calculated and compared with the target position, and tracking is accordingly performed. The tracking can be uniaxial, and preferably in particular no multiaxial tracking is performed. The digital image processing is based on a line-by-line evaluation of the detected shadow image.

In an embodiment, a use of a CSP system is provided to track the position of the sun with the system.

Further, a method is provided for tracking the sun with the CSP system, in which the steps include: detecting the shadow of a shadow blind on a shadow receiver, image processing of the shadow and determining the shadow position relative to a reference position, and/or tracking the sun with the CSP system. The tracking can be performed by a value that is proportional to the value of the deviation of the shadow position from the reference position.

In an embodiment, firstly an image from the camera is copied into a memory, wherein then a scan line is decomposed into black-and-white values, wherein then the intensity of the shadow is determined over the width of the shadow, wherein this is preferably carried out for several scan lines, most preferably at least 2, more preferably at least 4 and most preferably 6 or more than 6 lines, wherein further the shadow entrance, exit and penumbra region are determined for each line, and wherein subsequently the shadow centre is calculated and compared with the reference position of the shadow, finally the tracking path or angle is calculated via this difference and tracking is performed.

The described embodiments can be modified in many ways within the scope of protection of the claims. It is to be noted that the features of the aforementioned embodiments can be combined in one single embodiment. Depending on their configuration, embodiments of the invention therefore can comprise all or only some of the aforementioned features. The disclosure of the Figures is not intended to restrict the scope of protection of the invention. In the following, preferred embodiments are exemplarily described with reference to the Figures, in which:

Further scope of applicability of the present invention will become apparent from the detailed description given hereinafter. However, it should be understood that the detailed description and specific examples, while indicating preferred embodiments of the invention, are given by way of illustration only, since various changes, combinations and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 1 shows a schematic illustration of a parabolic trough power plant,

FIGS. 16A-C show a preferred exemplary configuration of a parabolic trough plant.

DETAILED DESCRIPTION

In the following explanations, the digital shadow analysis is exemplarily described by means of an IP camera. The technical data of a preferred camera can be summarized, only exemplarily, as follows:

| | |
|---|---|
| Image sensor | 1/3" High Resolution CCD image sensor |
| Effective pixels | 768(H) × 494(V) |
| Minimum illumination | 0.3 Lux/F1.4, 0 Lux (IR ON) |
| Lens F6.0 mm | |
| Lens angle | 48° |
| Electronic shutter | 1/60 (1/50) to 1/100,000 sec. |
| S/N ratio | More than 48 dB (AGC off) |
| White balance | Auto |
| AGC Auto | |
| IRIS mode | AES |
| Alarms notification | Send image to FTP or e-mail |
| Remote access | Yes |
| Motion detection | Yes |
| Infrared lamps | 56 LEDs |
| IP rating | IP67 |
| Infrared radiation distance | 130 ft. |
| Operating temperature | −10° C.~40° C. |
| Power source | DC12V |

The shadow image detected by the camera can be evaluated on different hardware platforms. The evaluation is not time-critical. For example, cycles of 1 second are preferred. The indication of 1 second is to demonstrate exemplarily that the adaptation of the alignment of the collectors is generally not time-critical. The algorithm described herein takes about 1 ms on a standard industrial personal computer so that shorter cycles can be applied as well. The cycles preferably should not be longer than 60 seconds, preferably not longer than 30 seconds and it is preferred that they are in the range of 1 ms to 15 seconds, and more preferred in a range of 0.5 seconds to 5 seconds. Preferably, a known personal computer or servers is used for the evaluation. As an alternative, preferably microprocessors/signal processors are used, in particular in the case of autarkical systems.

Figure 2:
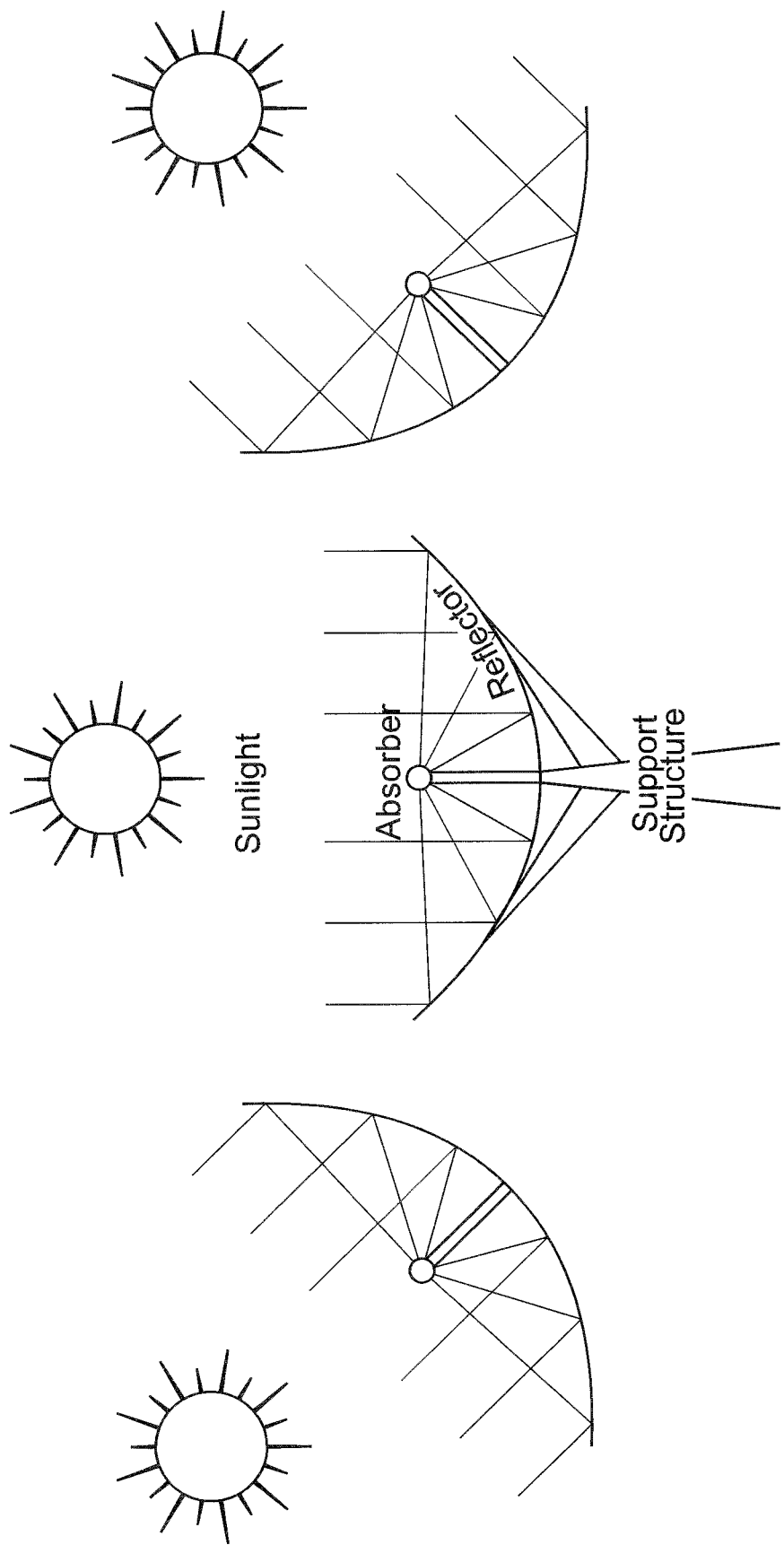
FIG. 2 shows a schematic illustration of its alignment according to the position of the sun.
Figure 3:
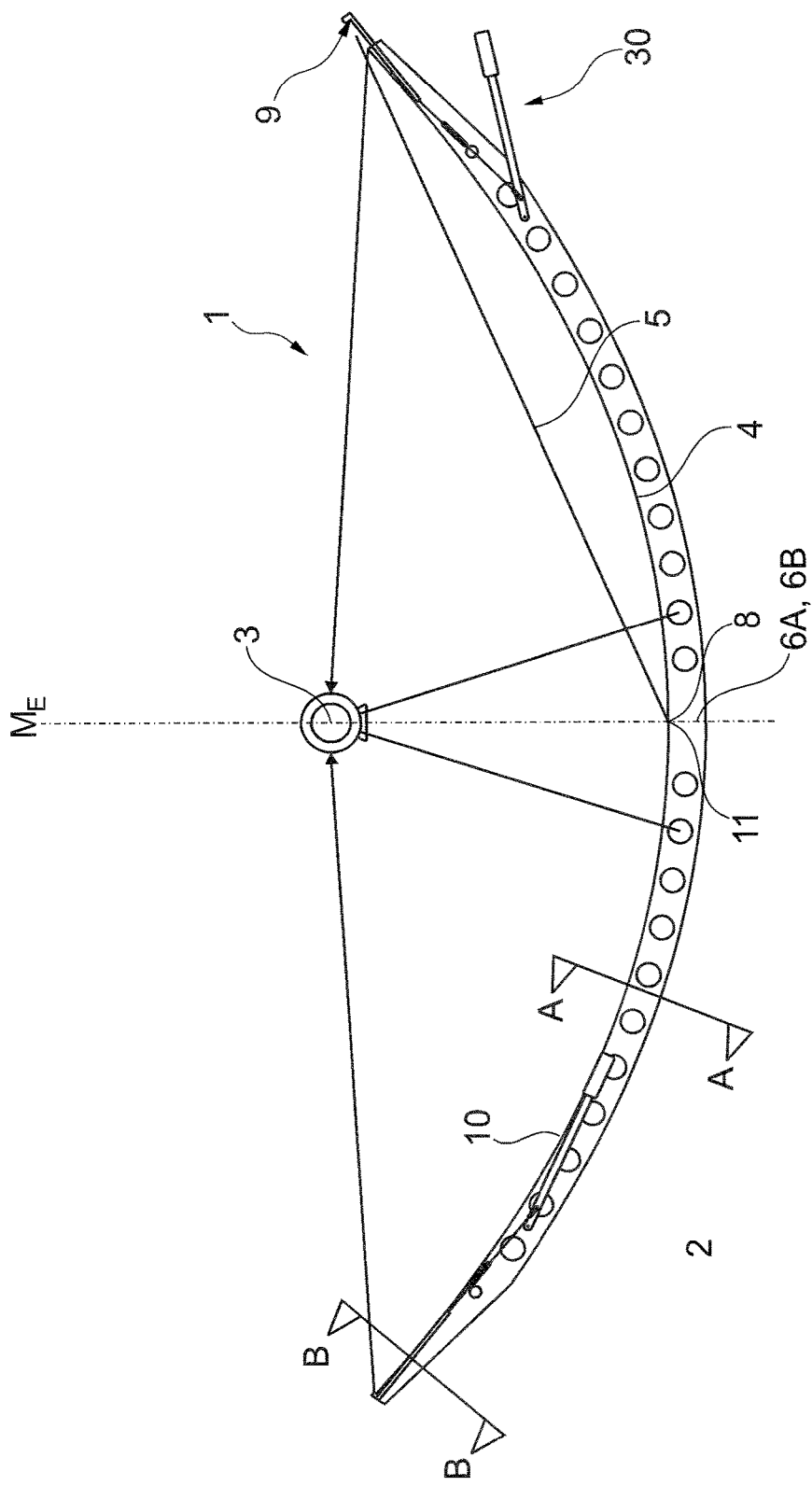
FIG. 3 shows a schematic illustration of an exemplary reflector structure comprising a parabolic trough mirror.
Figure 4:
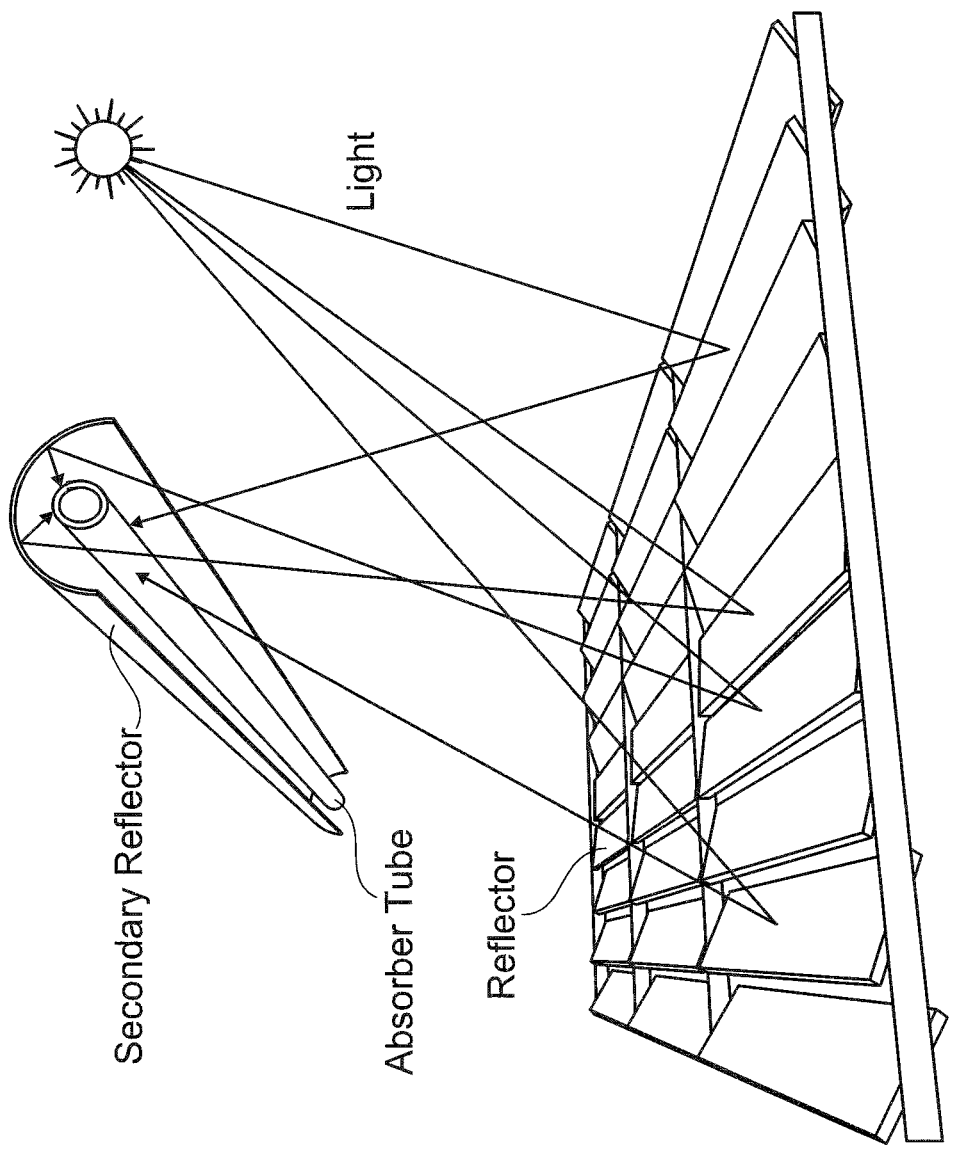
FIG. 4 shows a schematic illustration of an exemplary reflector structure comprising Fresnel mirror collectors.
Figure 5:
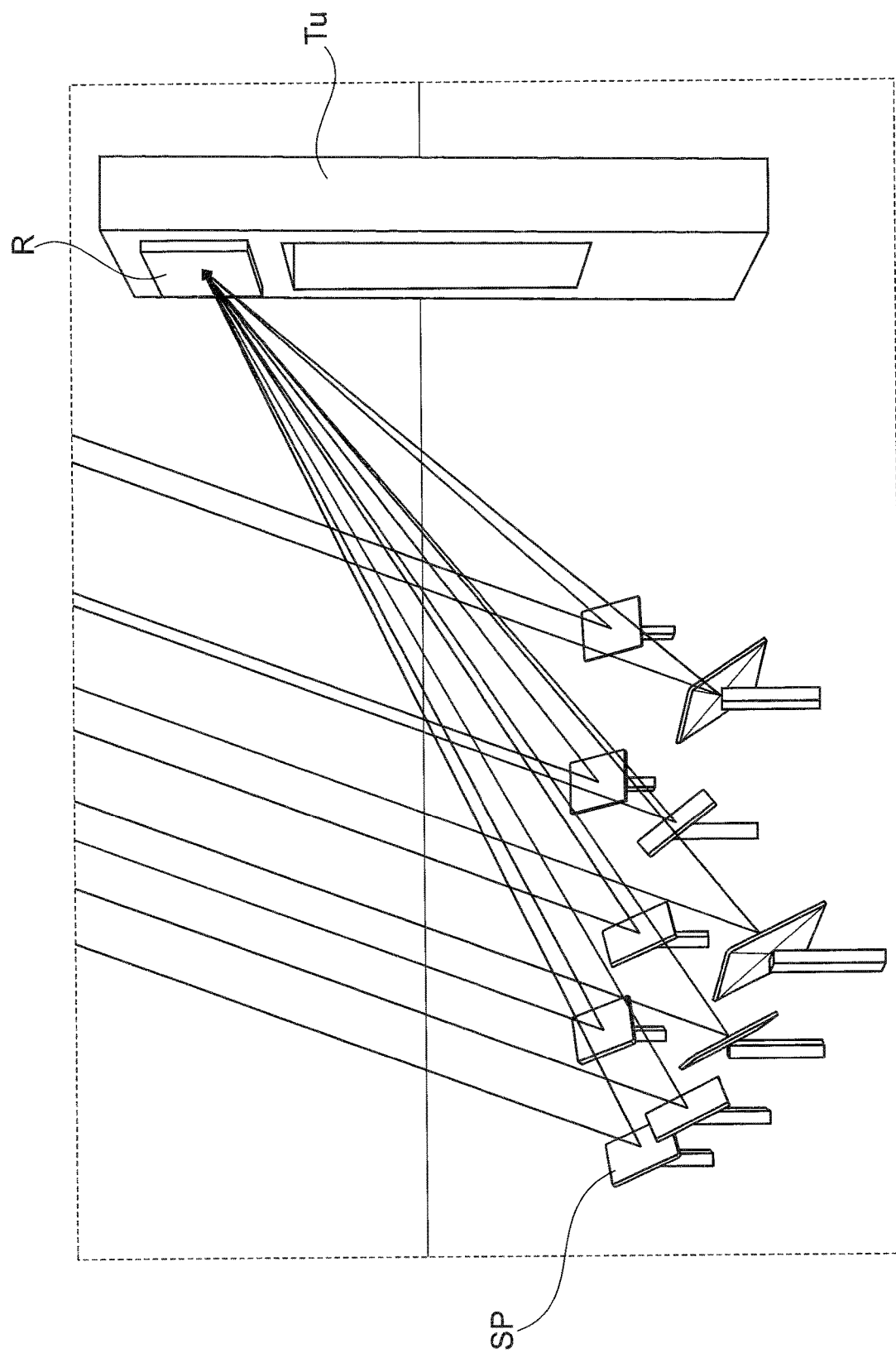
FIG. 5 shows a schematic illustration of an exemplary reflector structure in a central receiver power plant, here a solar tower power plant.
Figure 6:
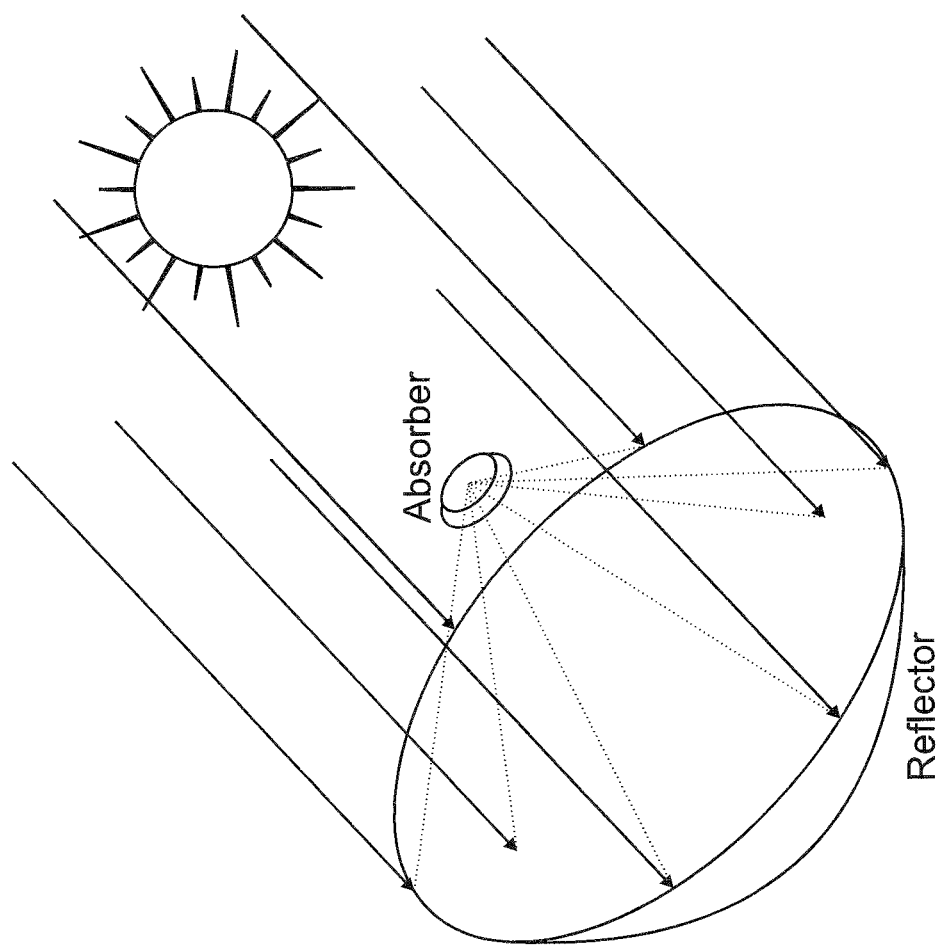
FIG. 6 shows a schematic illustration of an exemplary reflector structure in a plant comprising parabolic mirrors or solar Stirling plant.
Figure 7:
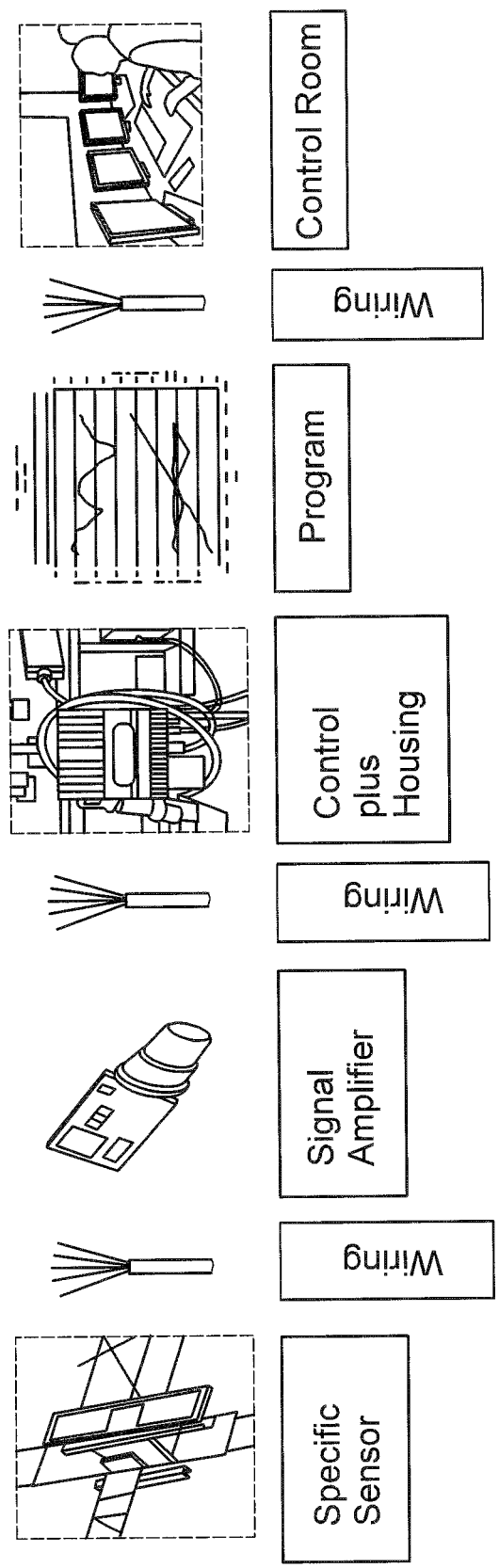
FIG. 7 shows the schematic structure of a conventional system comprising a PV cell sensor.
Figure 8:
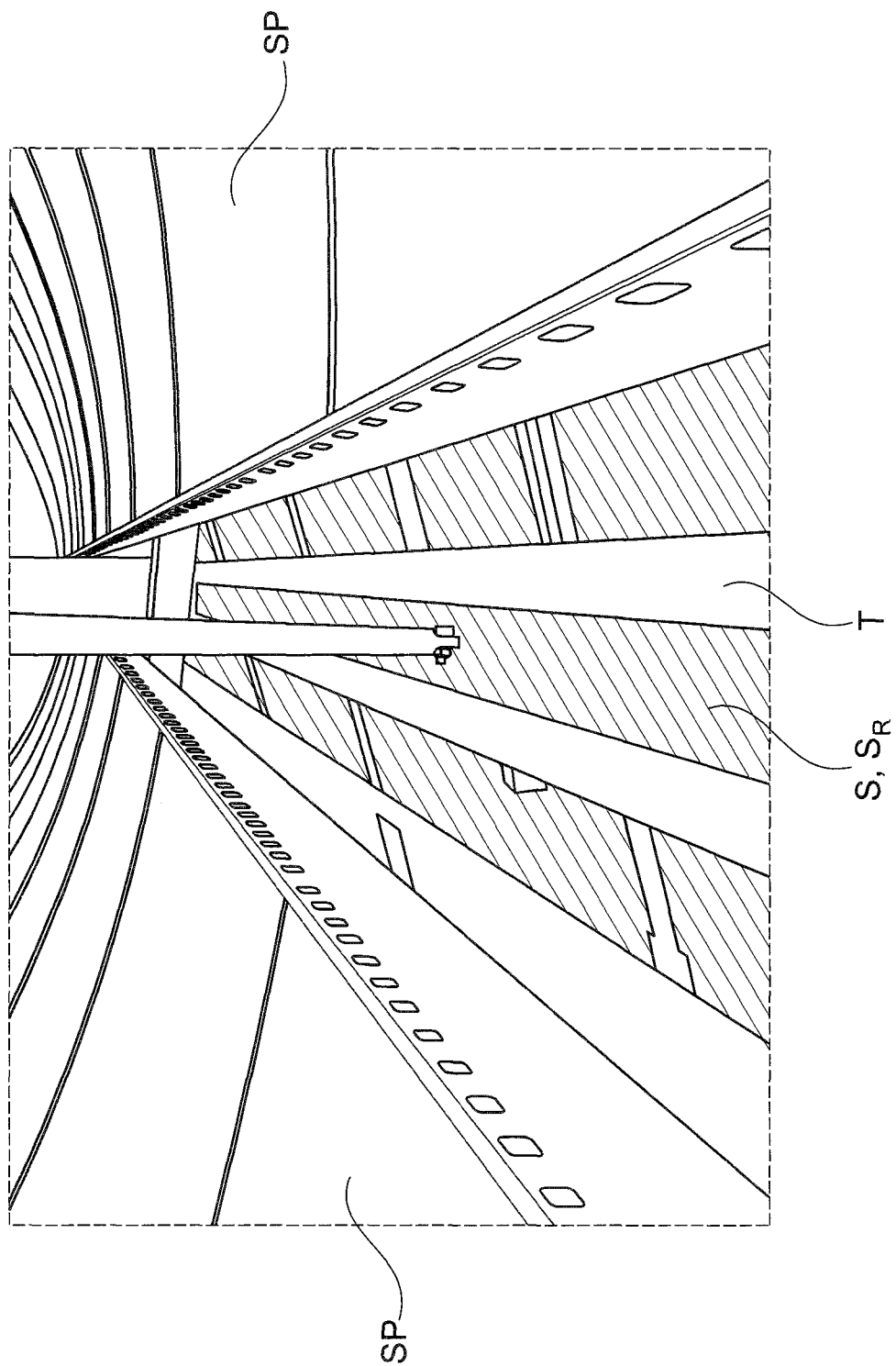
FIG. 8 shows the example of the cast shadow of a receiver tube of a parabolic trough plant in the collector.
Figure 9:
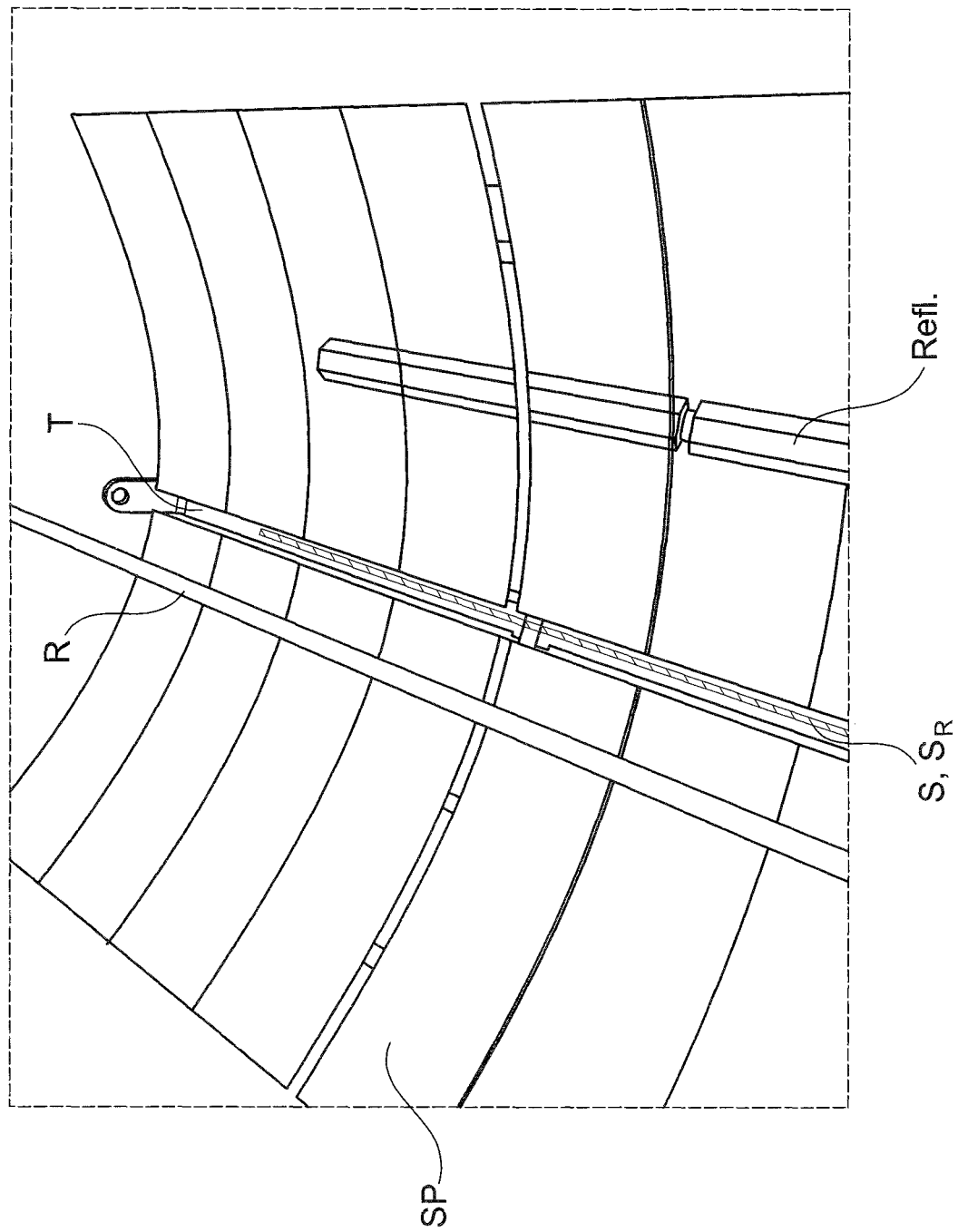
FIG. 9 shows a simplified rendered illustration of the cast shadow of a receiver tube of a parabolic trough plant in the collector.
Figure 10:
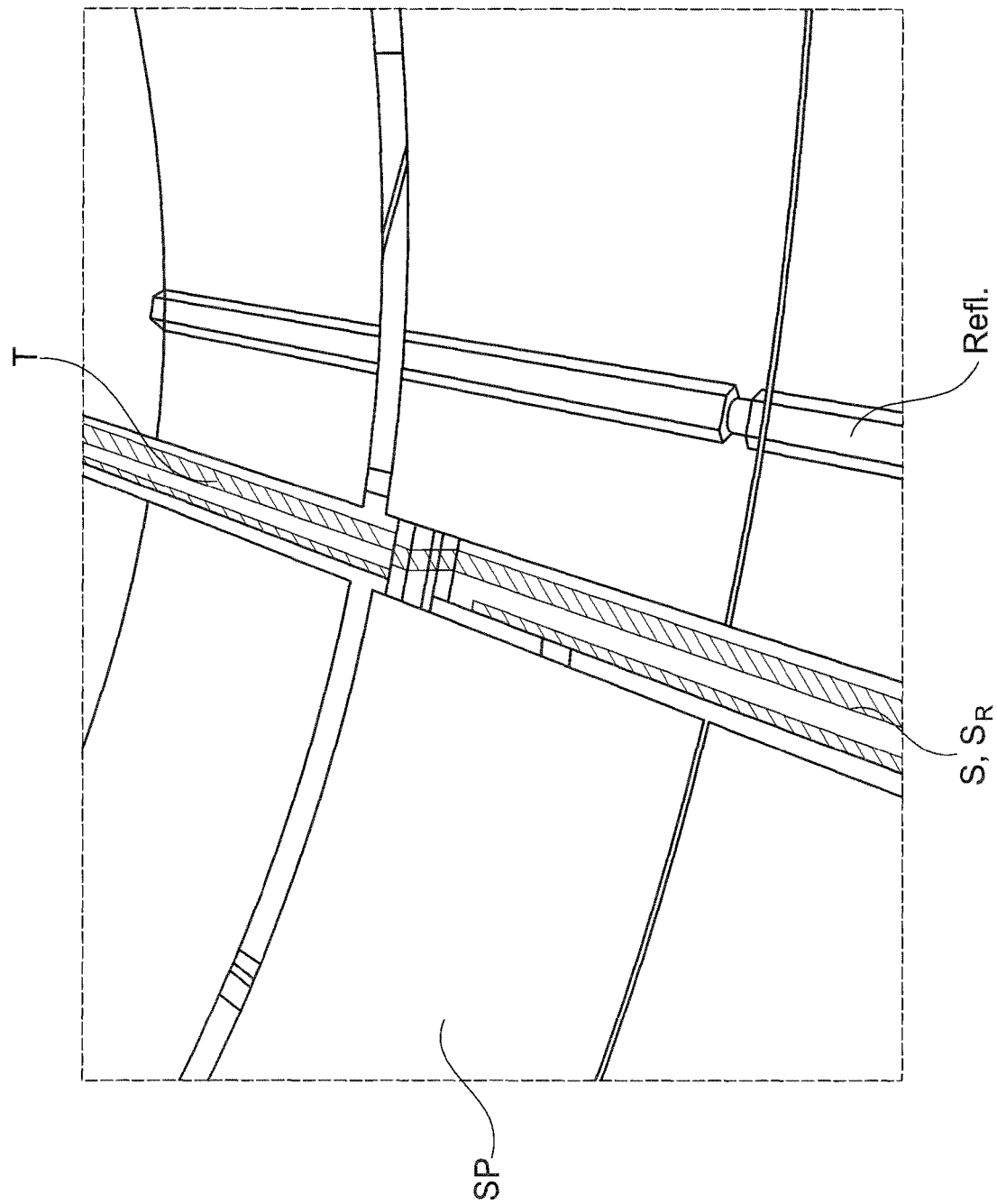
FIG. 10 shows a simplified rendered detail of the cast shadow of a receiver tube of a parabolic trough plant in the collector.
Figure 11:
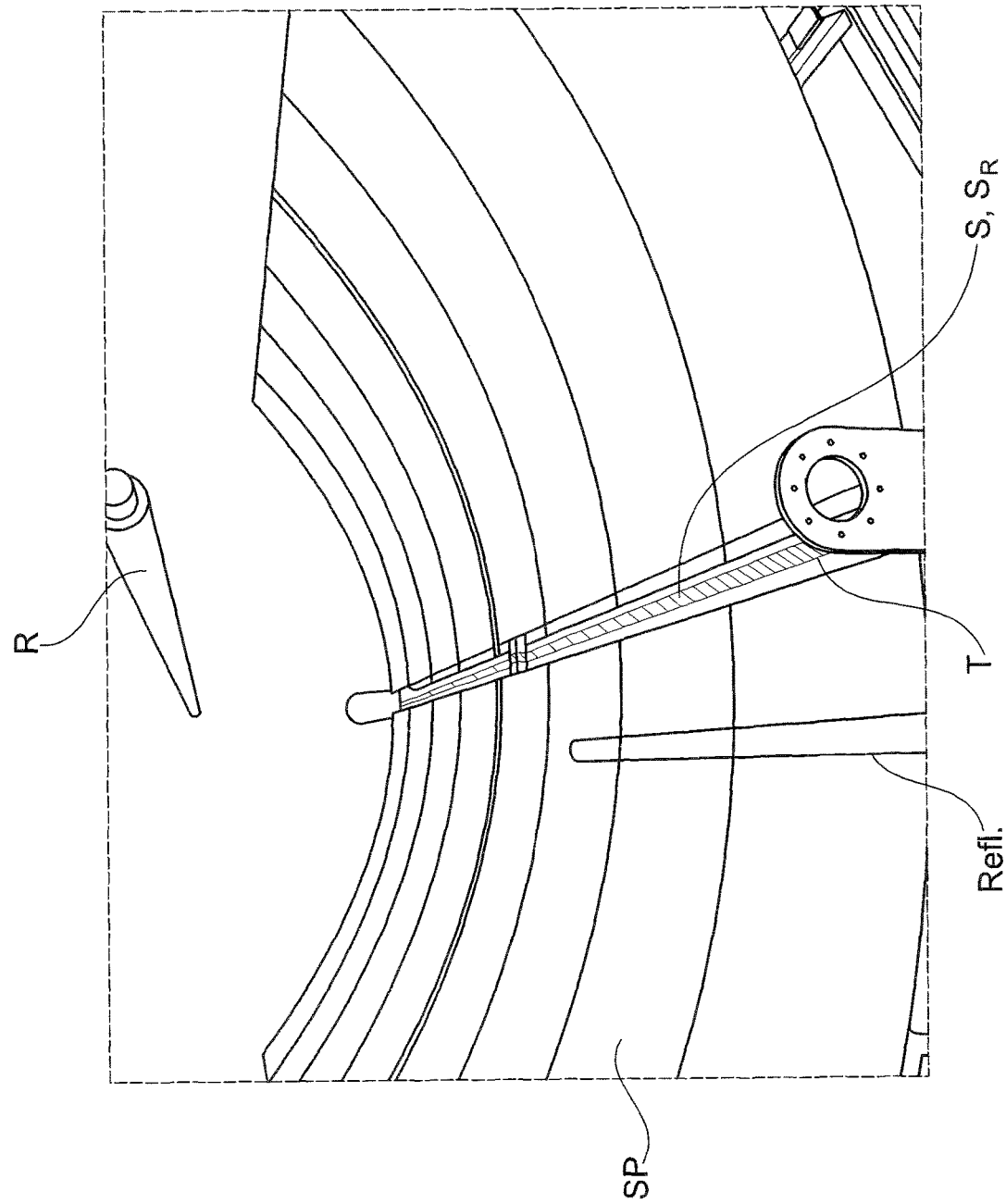
FIG. 11 shows a simplified rendered illustration of the cast shadow of a receiver tube of a parabolic trough plant in the collector.
Figure 12:
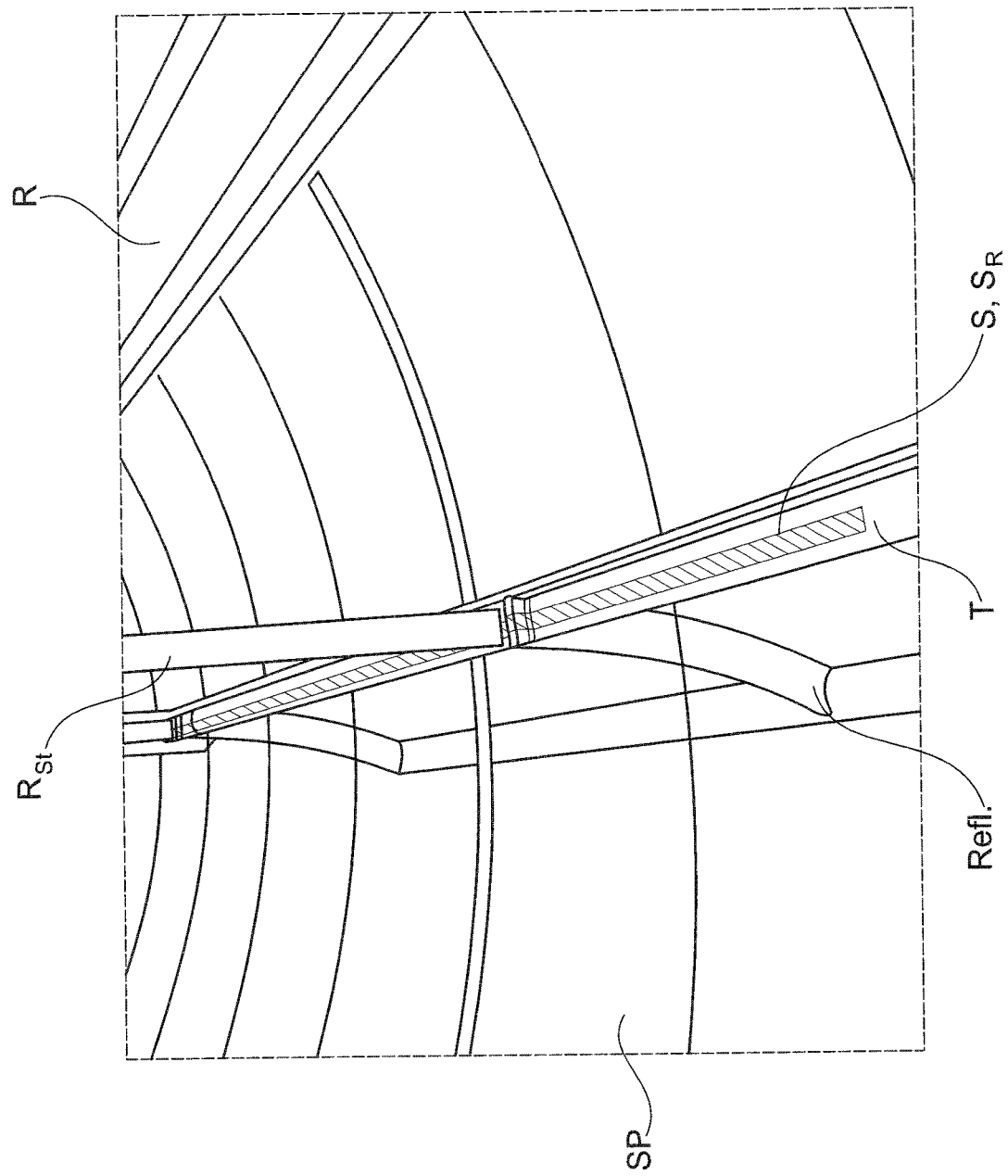
FIG. 12 shows a simplified rendered detail of the cast shadow of a receiver tube of a parabolic trough plant in the collector.
Figure 13:
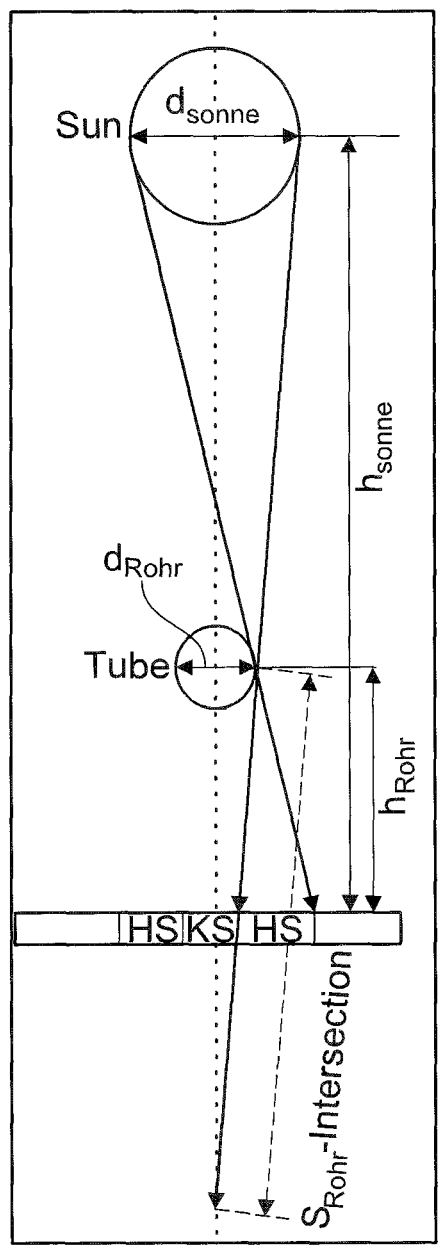
FIG. 13 shows the geometric conditions of the cast shadow using the example of the receiver tube shadow.
Figure 14:
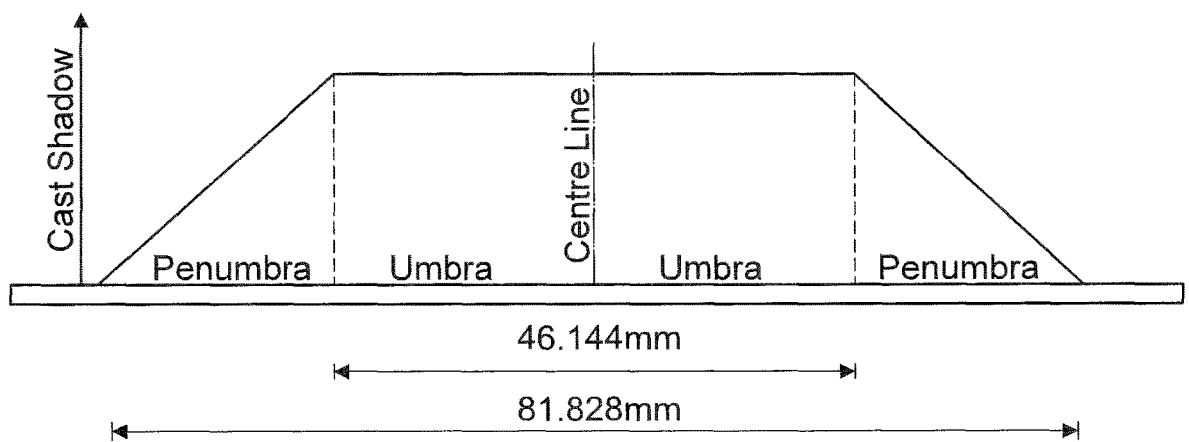
FIG. 14 shows a schematic illustration of an exemplary shadow of the receiver tube on a shadow receiver, wherein the central umbra and the lateral penumbras are highlighted.
Figure 15:
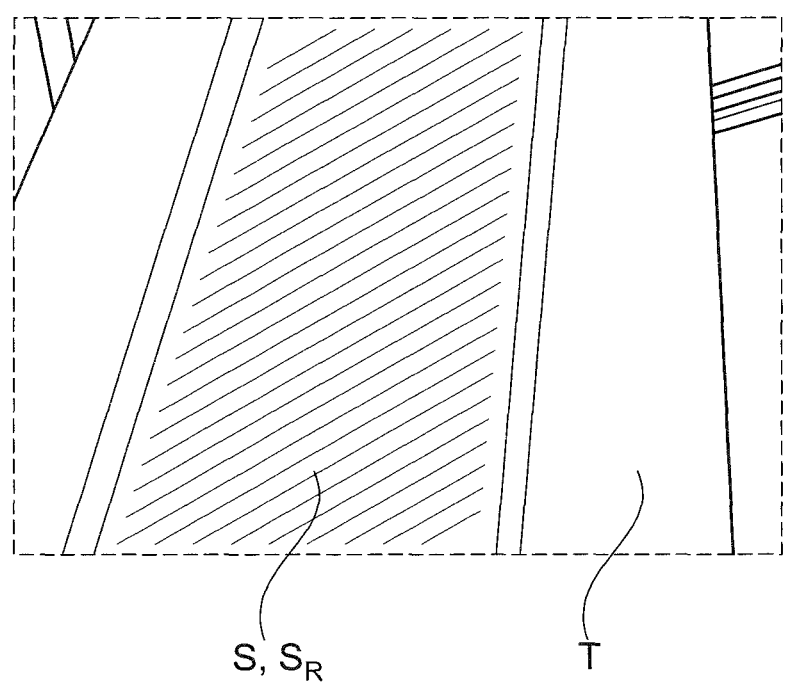
FIG. 15 shows an example of a raw image of a shadow which is detected by the camera.

FIG. 15 shows an example of a raw image of a shadow which is detected by the camera and analyzed by the evaluation unit. The shadow corresponds to the one described above, in particular in connection with FIGS. 8-12. The photo according to FIG. 15 shows the shadow on the beam T, here the torsion tube of a parabolic trough plant, in a resolution of 768×494.

The raw image can be transmitted via different wiring standards or also wireless, e.g., via radio, WLAN, Bluetooth, etc. The protocols that can be used in this connection are also numerous.

For a parabolic trough plant, the possible system resolution (angle-related) is in particular dependent on: the distance (position) of the shadow blind from (relative to) the axis of rotation of the parabolic trough, the distance (position) of the shadow receiver from (relative to) the axis of rotation of the parabolic trough, the position of the camera, the shooting angle of the camera, the resolution of the camera, and/or the resolution of the algorithm used.

In the following, a sample calculation is made in which the system resolution is at about 0.03° and the measurement range at 2.1° or more. Further preferred ranges can be deduced from the entire description. With these parameters, the repetitive error is preferably small and the starting accuracy excellent. The result is preferably not dependent on the weather, radiation intensity or contamination.

FIGS. 16A-C show an exemplary configuration of a parabolic trough plant in a cross-sectional view (FIG. 16A) as well as in a schematic three-dimensional view (FIG. 16B) and in a top view (without mirror SP, i.e., only substructure visible) (FIG. 16C). The system comprises a plurality of mirror elements Sp forming a reflector, here a parabolic trough. The mirrors focus the incident sunlight such that it is concentrated onto the receiver, here a receiver tube or absorber tube R. The receiver is arranged in the focal spot or focal line of the reflector. The system comprises a substructure or supporting structure for holding the reflector and the receiver. The supporting structure can be realized in different ways. The alignment of the system can be adapted, i.e. the system is movable along at least one axis. The preferred embodiment can be swivelled, as illustrated here, along an axis arranged in the area of the deepest point of the parabolic trough. This axis is preferably parallel to the longitudinal axis of the receiver.

With exemplary reference thereto as well as to Figures described above, in particular FIGS. 8-15, a preferred calculation of the system resolution as well as the determination of the detection and measurement range is discussed in the following.

The preferred collector design illustrated in FIGS. 16A-C have turned out to be particularly advantageous. The design comprises parabolic trough collectors. The receiver tube is used as the shadow blind. The function of the shadow receiver is assumed by the central torsion tube T of the substructure.

The design according to a preferred embodiment has the following parameters:

| Parameter | Value Unit |
|---|---|
| Angle of view to be observed | 256 [mm] |
| Resolution of the camera (per line) | 768 [pixel] |
| Distance of shadow receiver | 1905 [mm] |
| Shadow width | 110 [mm] |
| Resolution of the algorithm | 3 [pixel] |

The above indicated parameters lead to the accuracy calculated below. It can be generally said that the 768 pixel are sufficient for a significant increase in efficiency and render the system economically interesting. With equipment of 1920 pixel, which is available as standard equipment by now, the resolution doubles so that here the range between 768 pixel or more and 1920 pixel can be used.

In the following, the calculation of the system resolution is exemplarily shown.

A distinction can be made between the resolution of the shadow receiver and the parameter to be measured later, e.g., the deviation of the angle of rotation.

Relevant parameters for the system resolution of the shadow receiver are for example, the angle of view to be observed [mm], the resolution of the camera [pixel], and/or the resolution of the algorithm to be expected [pixel].

In this connection, the following holds: resolution of shadow receiver=angle of view [mm]/resolution of camera [pixel] *resolution of algorithm [pixel]; resolution of shadow receiver=256 [mm]/768 [pixel] *3[pixel]=1 [mm]; resolution of shadow receiver=1 [mm]

Parameters for the system resolution in order to measure the deviation of the angle of rotation can be the resolution of the shadow receiver, and/or the distance (position) of the shadow blind from (relative to) the shadow receiver.

In this connection, the following holds: resolution of angle of rotation=arctan (resolution of shadow receiver [mm]/distance of shadow receiver [mm]); resolution of angle of rotation=arctan (0.00052); and/or resolution of angle of rotation=0.029794 [°]

The detection range is of interest for the maximum measurement range of the angle of rotation. Relevant values are the width of the shadow receiver, and/or the width of the shadow.

As regards the following calculations, it is to be noted that when the measurement range is halved, e.g., by halving the angle of view, the resolution is doubled (mathematically halved).

Measurement range=arctan (movement range of shadow [mm]/distance of shadow receiver [mm]); Measurement range=arctan ((½ angle of view [mm]–½ width of shadow [mm])/distance of shadow receiver [mm]); Measurement range=arctan ((½ 256 [mm]–½ 110 [mm]/distance of shadow receiver [mm]); and/or Measurement range=±2.1945 [°]

Figure 17A:
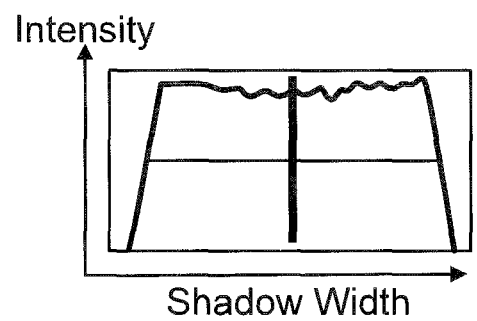
FIGS. 17A-E show an exemplary visualization of a preferred algorithm comprising the steps of: decomposing the scan line in black-and-white values and/or increasing the contrast (FIG. 17A), selecting several scan lines (FIG. 17B), determining the shadow entrance, exit and penumbra regions for each line (FIG. 17C), forming a geometric perimeter for each line to be analyzed (FIG. 17D) and calculating the deviation of the actual position from the target position (FIG. 17E)

The evaluation of the measurement as well as the algorithm used can be put into practice in different ways. In a preferred method, the evaluation is performed as follows (cf. FIGS. 17A-E): The image from the camera is copied into the memory. A scan line is decomposed in black-and-white values and the contrast is increased. The intensity of the shadow is plotted over the width of the shadow (mm) along one of the lines depicted in FIG. 17B, as illustrated in FIG. 17A (cf. FIG. 17A). This is carried out for several scan lines (preferably at least 2, more preferably at least 4 and most preferably 6 or more than 6 lines), in particular in order to identify possibly existing contaminated spot-like regions (e.g., bird droppings) and exclude them from the analysis (cf. FIG. 17B).

Figure 17B:
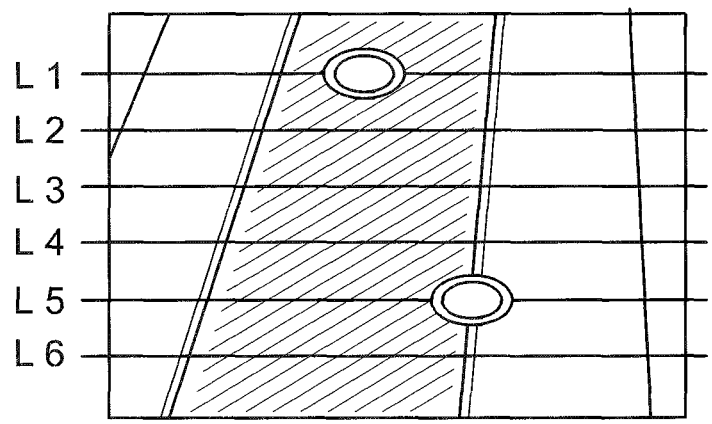
Figure 17C:
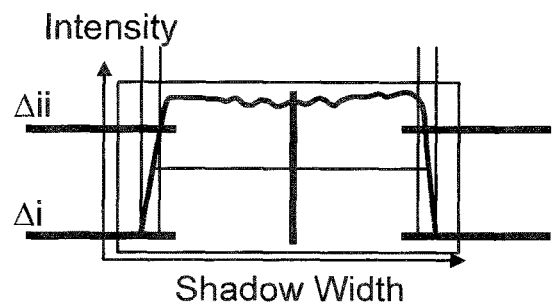
Figure 17D:
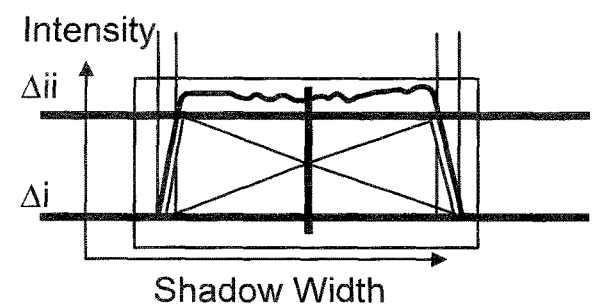

In the solution according to the present invention, however, contaminations are advantageously only problematic in the zone of the shadow transition; cf. line 5 in FIG. 17B. In the shadow itself, they have no influence on the measuring result; cf. line 1 in FIG. 17B. In the example according to FIGS. 17A-E, line 1 is unproblematic because the contamination occurs within the shadow and not in the transition zone. Line 5, in which there is a contamination in the transition zone, was not used for the shadow analysis.

The shadow entry, exit and penumbra are determined for each line. This can be performed via adjustable intensity values or intensity thresholds (cf. FIG. 17C).

Figure 17E:
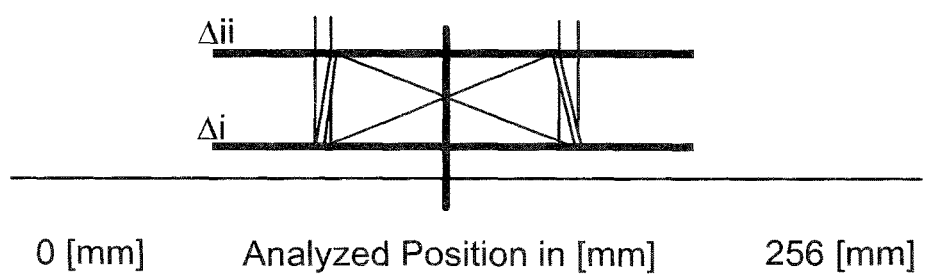

A kind of rectangle, in particular a trapezoid, is formed for each line to be analyzed. This is preferably made during a geometric analysis or image processing. To this end, preferably four points are determined: shadow entry and shadow exit (on the left and right outer sides at the bottom of FIG. 17D) as well as umbra entry and umbra exit (on the left and right outer sides at the top of FIG. 17D). According to a preferred embodiment, the points can be preferably shifted inwardly relative to the trapezoid with respect to the geometrically determinable value by a defined buffer value. The buffer is depicted in FIG. 17E as $\Delta i$ (lower limit) and $\Delta ii$ (upper limit). $\Delta i$ and $\Delta ii$ can be, for example, at 3 to 15% of the actual intensity (relative to the geometrically determined actual value), preferably at about 10%. Alternatively, $\Delta i$ and $\Delta ii$ can be at 3 to 15%, preferably about 10%, of a predetermined reference tolerance. Bad visibility conditions etc. can thus preferably be counteracted. The determination is preferably independent of the prevailing sun conditions (cf. FIG. 17D).

The shadow centre (actual position) is calculated and compared with the target position. The shadow centre is in the area centre of the rectangle. The deviation from the target position in which the solar radiation is optimally concentrated onto the receiver can be calculated via the X value (horizontal line in FIG. 17E). The tracking path and angle can be calculated via this difference and the tracking can be performed. The target position preferably corresponds to the geometric centre of the shadow receiver. However, depending on the geometric conditions, it is also possible that another target position is determined. The target position can be geometrically or graphically marked or can be provided as a mechanical, detectable element in order to be detected by the camera. An evaluation can then be performed directly via the image processing. Alternatively, the target position can be predetermined in the image reference. In this alternative, the target position preferably can be adjustable and, if necessary, re-adjusted.

According to the system and method according to the present invention, preferably an IP camera is used for analyzing the shadow. The receiver tube is preferably used as the shadow blind, and a beam, preferably the so-called torsion tube, serves as the shadow receiver. The camera takes the image of the shadow of the shadow blind and a program analyzes the position of the shadow.

Figure 18:
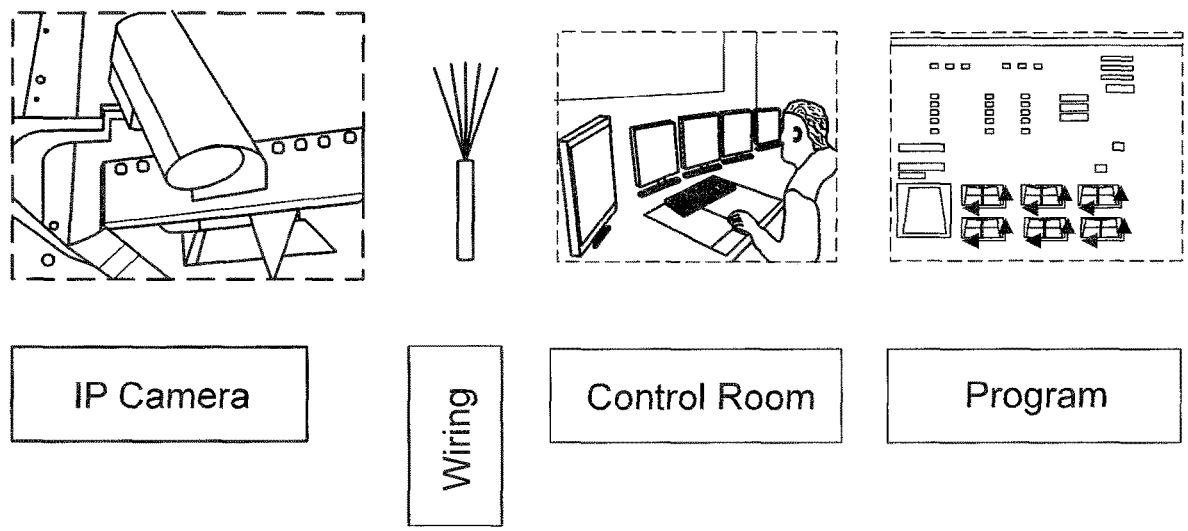
FIG. 18 shows the exemplary setup of a system according to the present invention.

The system preferably comprises (cf. FIG. 18): an (IP) camera+wiring, a program for analyzing the signal values, as well as an interface with the control room. The program is preferably directly run in the control room—in contrast to the prior art, where the program, as far as comparable, is run in a separate control.

The system and method according to the present invention have proved to be advantageous, in particular in comparison with the solutions known from the prior art.

The system according to the present invention comprises, for example, far fewer components than solution approaches known so far. Thereby it is possible to save costs. The necessary components can be installed faster and more easily and can also be put into operation faster and more easily. Fewer disciplines are involved and necessary so that less employee costs in the areas of development, support installation and operation arise. Since all components are serially dependent, i.e. are already present in the system and/or can be supplemented by standard purchased parts, the new solution has a considerably higher availability. In case of failure, the defective components can be identified more promptly and exchanged faster.

The sensors are considerably more long-lasting than those of the prior art due to the use of a camera, preferably a CCTV camera and more preferably an IP camera, in particular in comparison with systems using components such as a PV cell or signal amplifier, which are subject to a degeneration and partly have considerable component deviations. Furthermore, far less maintenance is necessary. Partly, almost no maintenance is necessary any longer due to the use of qualitative series products. The cleaning cycles are also considerably longer in comparison with existing systems, on average in a ratio of 1 10. In the case of a defect, the system according to the present invention is also advantageous. Individual components are exchangeable even after many years without entailing restrictions due to the entire system. When the camera is exchanged, for example, the only requirement is that the technology is suitable for a network. Resolution, speed (frames per second), size and many other parameters are not relevant or restricted. Partly, they are parameterizable by the software. Finally, in comparison with PV cell sensors, it can be chosen from considerably more manufacturers. Finally, the position of the camera in the system is not restricted to a specific place at which it must be mounted. It must only recognize the shadow in the shooting area.

The wiring in the system described herein is reduced. Cost savings can thus be realized when purchasing the system. In particular, different kinds of wiring, such as signalling cables, control cables and network cables, are not required and only a network cable remains. Additionally, the wiring is less expensive as regards the installation, since only one discipline (network cable) is involved. Since the preferred use of a wireless transmission technology, such as, for example, the WLAN technology (industrial WLAN), even the network cable can be omitted. All in all there are fewer plug connections, which entails less error sources and thus less (electromagnetic compatibility) problems.

The use of digital image processing is simple, cost-efficient and future-proof. In case of a change in the platform, such as, for example, the operating system or the hardware, the use of the system can be continued. There is usually no need for expensive and long maintenance contracts. Performance improvements can be achieved very simply by means of software/algorithm updates, in particular without having to interfere with the mechanical structural components. In comparison therewith, a new sensor would have to be developed in the case of the solution with PV cells, which would cause enormous costs alone for the exchange in the field. Digital image processing can be used for monitoring and rough measurement of radiation values. For example, a rough weather analysis can be made therewith, for example "clear day" in contrast to "humidity" or "cloudy". Finally, a higher precision can be achieved, preferably by about 0.3° in comparison with known systems. Such a higher precision increases the entire efficiency in a normal industrial collector by about 3%. This means that the operator requires 3% less land or has a yield that is higher by 3%—while the prime cost and maintenance cost are lower. The system is also considerably less sensitive and can better react to spot-like contaminations (e.g. bird droppings) and impairment by dust and better compensate for the result than conventional systems. Finally, the remote maintenance is considerably simplified. The system can additionally be used for the rough measurement of the radiation situation. Moreover, the present invention permits to selectively control the performance of the plant, for example also via a desired "deviation" from the optimal alignment.

As far as the preceding description uses the term "essentially", embodiments realizing the respective feature in full or completely are also covered. The terms "a plurality of" or "several" are to be understood within the meaning of "at least two", i.e., two or more. As far as concrete values are indicated, slight deviations of these values are preferably covered as well, such as, for example deviations of ±10% or ±5% of the respective value. Individual aspects of the invention can form independent inventions and also be claimed as such.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A Concentrated Solar Power (CSP) system comprising:
    a reflector, the reflector being a parabolic trough; and
    a receiver for concentrating the solar radiation incident on the reflector onto the receiver, the receiver being a receiver tube and the receiver tube being a shadow blind;
    a shadow receiver;
    a color and/or brightness digitizing sensor arranged to detect a shadow of the shadow blind on the shadow receiver in order to determine a deviation of an actual shadow position of the shadow from a target position of the shadow by digital image processing; and
    a tracker configured to adapt the position of the reflector and the receiver according to the deviation,
    wherein the color and/or brightness digitizing sensor is not the shadow receiver, and
    wherein the color and/or brightness digitizing sensor is a camera configured to detect a shadow image.

2. The CSP system according to claim 1, wherein the arrangement is configured such that, when the reflector is optimally aligned with respect to the sun, the shadow of the shadow blind falls onto the shadow receiver at a predetermined position, preferably centrically.

3. The CSP system according to claim 1, wherein the camera is fixed at an existing structure, or at a beam of the shadow blind or of the receiver, or at the receiver itself.

4. The CSP system according to claim 1, wherein the camera is arranged between the shadow blind and the shadow receiver.

5. The CSP system according to claim 1, wherein an evaluation cycle of the shadow detected by the sensor is about 1 second or less.

6. The CSP system according to claim 1, wherein the system or a control, is configured:
    to copy an image from the camera into a memory; and
    to evaluate the image, preferably in that a scan line is decomposed into black-and-white values and/or a contrast is increased,
    wherein step of evaluating the image is carried out for several scan lines,
    wherein a shadow entrance, exit and penumbra region are determined for each line,
    wherein a rectangle is formed for each line to be analyzed,
    wherein a shadow center (actual position) is calculated and compared with the target position, and
    wherein the tracking is accordingly performed.

7. The CSP system according to claim 1, wherein the system tracks a position of the sun.

8. A method for tracking the sun with a CSP system according to claim 1, the method comprising:
    detecting a shadow of a shadow blind on a shadow receiver;
    image processing the shadow;
    determining the shadow position relative to a reference position; and
    tracking the sun with the CSP system.

9. The method according to claim 8, wherein tracking is performed by a value that is proportional to the value of the deviation of the shadow position from the reference position.

10. The method according to claim 8, wherein an image from the camera is copied into a memory, wherein a scan line is decomposed into black-and-white values, wherein the intensity of the shadow is determined over the width of the shadow, wherein this is preferably carried out for several scan lines, most preferably at least 2, more preferably at least 4 and most preferably 6 or more than 6 lines, wherein the shadow entrance, exit and penumbra region are determined for each line, wherein subsequently the shadow center is calculated and compared with the reference position of the shadow, and wherein the tracking path or angle is calculated via this difference and tracking is performed.

* * * * *